United States Patent [19]

Muraoka et al.

[11] Patent Number: 5,323,274
[45] Date of Patent: Jun. 21, 1994

[54] REPRODUCING APPARATUS

[75] Inventors: Yoshiro Muraoka, Tokyo; Yoshiki Shirochi, Chiba, both of Japan

[73] Assignee: Sony Corporation, Tokyo, Japan

[21] Appl. No.: 147,915

[22] Filed: Nov. 4, 1993

Related U.S. Application Data

[63] Continuation of Ser. No. 715,646, Jun. 14, 1991, abandoned.

[30] Foreign Application Priority Data

Jun. 20, 1990 [JP] Japan ................................ 2-162297

[51] Int. Cl.$^5$ .............................................. G11B 5/02
[52] U.S. Cl. ....................................... 360/27; 360/19.1
[58] Field of Search ....................... 360/27, 19.1, 33.1, 360/18; 358/341, 343; 369/49, 48

[56] References Cited

U.S. PATENT DOCUMENTS

| | | | |
|---|---|---|---|
| 4,445,151 | 4/1984 | Kinoshita et al. | 360/27 |
| 4,583,132 | 4/1986 | Nakano et al. | 360/19.1 |
| 4,630,134 | 12/1986 | Kanamaru | 358/343 |
| 4,965,674 | 10/1990 | Nagasawa et al. | 358/341 |

FOREIGN PATENT DOCUMENTS

| | | |
|---|---|---|
| 062783 | 10/1982 | European Pat. Off. . |
| 404465 | 12/1990 | European Pat. Off. . |
| 411948 | 2/1991 | European Pat. Off. . |
| 59157807 | 1/1985 | Japan . |
| 62-006586 | 6/1987 | Japan . |
| 1125702 | 5/1989 | Japan . |
| 1150207 | 6/1989 | Japan . |

*Primary Examiner*—Robert J. Pascal
*Assistant Examiner*—Tan Dinh
*Attorney, Agent, or Firm*—Lewis H. Eslinger; Jay H. Maioli

[57] ABSTRACT

An apparatus reproduces an information signal modulating a carrier signal recorded on a magnetic tape. A portion of the signal being boosted in accordance with a characteristic of the information signal. The apparatus comprises a playback device for reproducing the information signal from the magnetic tape, a detector for detecting the levels of the portion of the signal and the rest of the signal respectively and comparing the levels with each other, and a judging circuit for judging the characteristics of the signal in accordance with the output of the detector.

10 Claims, 5 Drawing Sheets

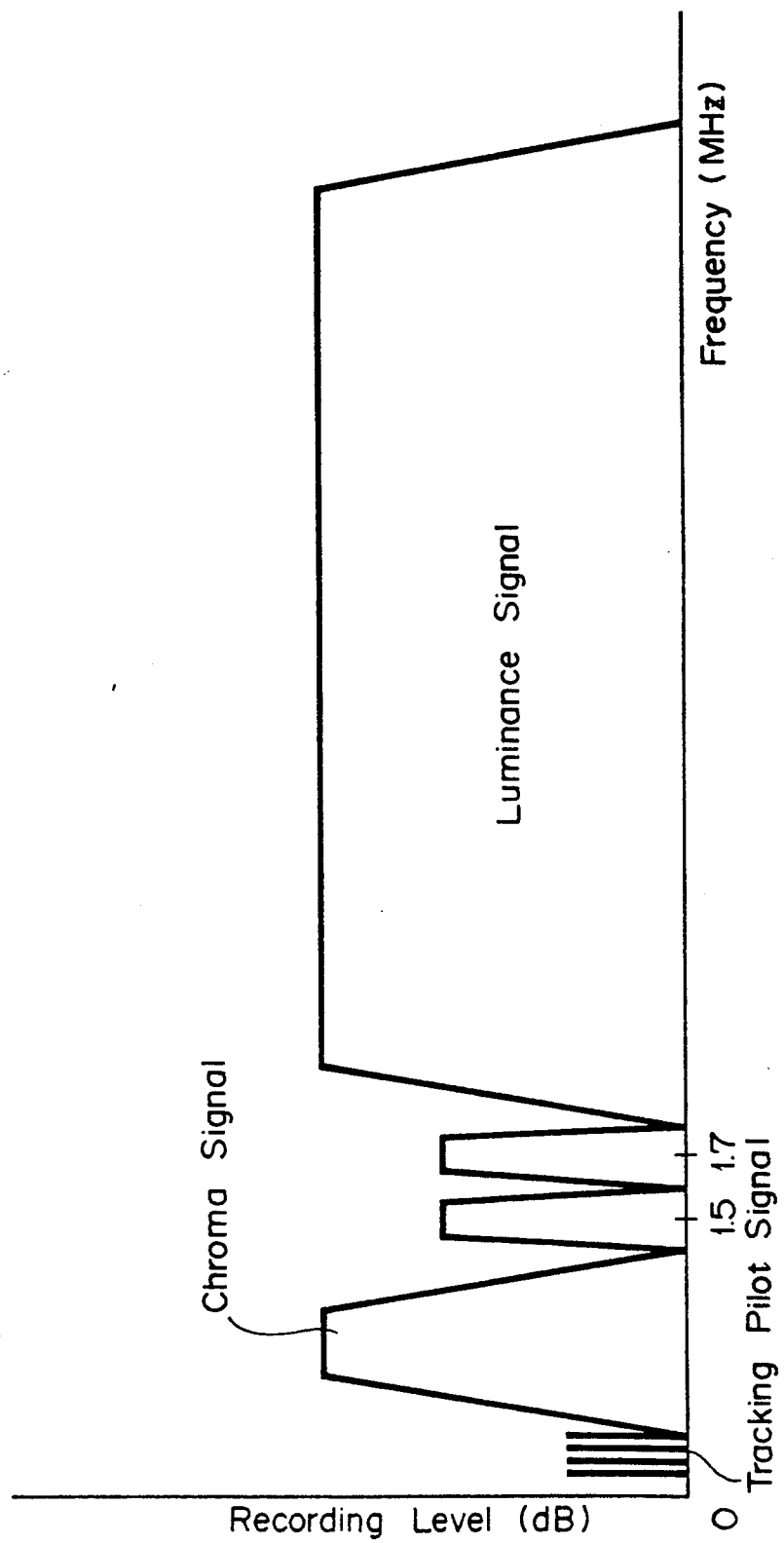

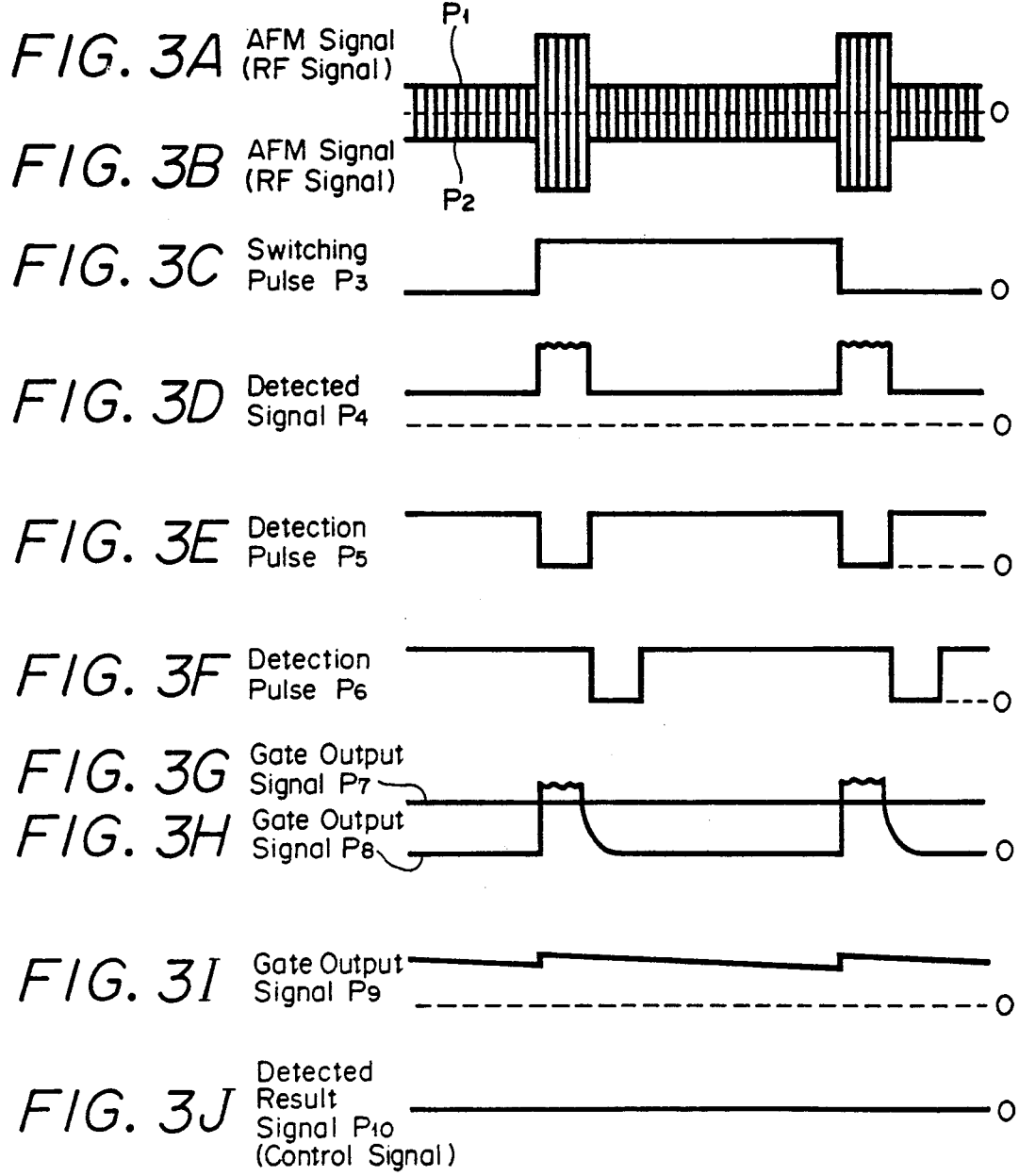

FIG. 4A AFM Signal (RF Signal) 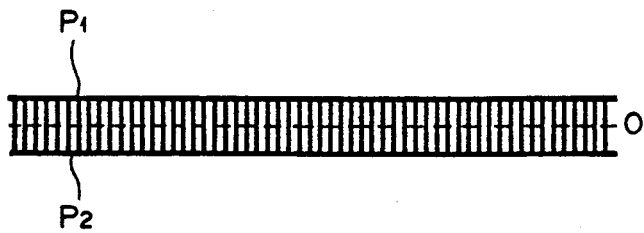
FIG. 4B AFM Signal (RF Signal)
FIG. 4C Switching Pulse P3 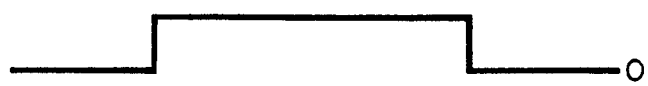
FIG. 4D Detected Signal P4 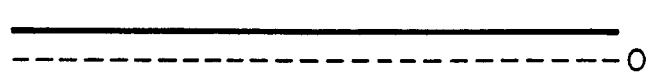
FIG. 4E Detection Pulse P5 
FIG. 4F Detection Pulse P6 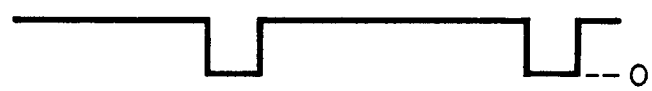
FIG. 4G Gate Output Signal P7 
FIG. 4H Gate Output Signal P8 
FIG. 4I Gate Output Signal P9 
FIG. 4J Detected Result Signal P10 (Control Signal) 

REPRODUCING APPARATUS

This is a continuation of application Ser. No. 07/715,646, filed Jun. 14, 1991 and now abandoned.

BACKGROUND OF THE INVENTION

1. Field of the Invention

The present invention generally relates to reproducing apparatus and more particularly to a reproducing apparatus for use with, for example, a so-called 8-mm video tape recorder (8-mm VTR) or the like.

2. Description of the Prior Art

Conventional video tape recorders, such as an 8-mm video tape recorder and so on are designed so as to process either a monaural audio signal in which a carrier of an audio signal is 1.5 MHz or a stereo audio signal in which a carrier of one audio signal is 1.5 MHz and a carrier of the other audio signal is 1.7 MHz. In the 8-mm video tape recorder which records and/or reproduces the stereo audio signal, if an audio signal in the signal to be recorded is a stereo signal, then such audio signal is not processed and directly recorded on a magnetic tape. If the audio signal in the signal is a bilingual signal (e.g., Japanese, English, etc.), then the vertical blanking period, for example, of the audio signal is boosted by about 7 dB above the normal level and then recorded on the magnetic tape. A recording format for recording a television signal is represented in FIG. 1, wherein a left audio signal (hereinafter simply referred to as an AFM (audio FM) signal) utilizes a carrier of 1.5 MHz and a right audio signal (AFM signal) utilizes a carrier of 1.7 MHz. These left and right audio signals are FM-modulated together with a pilot signal, a chroma signal and a luminance signal and then recorded on a magnetic tape.

When the thus recorded signals are reproduced from the magnetic tape, it is determined by comparing the average level of the vertical blanking periods of the reproduced AFM signal (RF signal) with the average level of the AFM signal of one field period whether the AFM signal is the bilingual signal or the stereo audio signal. If it is determined that the AFM signal is the bilingual signal on the basis of the detected result, then the bilingual signal is not subjected to the addition and subtraction processings. On the other hand, if it is determined that the AFM signal is the stereo audio signal, then the stereo audio signal, i.e., the sum and difference signals of the left and right audio signals are subjected to the addition and subtraction processings to thereby obtain left and right audio signals.

In the above method in which the average level of the AFM signal of the vertical blanking period and the average level of the AFM signal of one field period are compared with each other, if the level of the AFM signal fluctuates, then the level difference between the average level of the AFM signal of the vertical blanking period and the average level of the AFM signal of one field period is decreased. As a consequence, even though the vertical blanking period of the AFM signal is boosted, it is erroneously determined that the AFM signal is the stereo audio signal. Further, even though the vertical blanking period of the AFM signal is not boosted, it is also erroneously determined that the AFM signal is the bilingual signal. There is then the disadvantage that a boosted pilot signal cannot be detected satisfactorily.

OBJECTS AND SUMMARY OF THE INVENTION

Accordingly, it is an object of the present invention to provide an improved reproducing apparatus in which the aforenoted shortcomings and disadvantages encountered with the prior art can be substantially eliminated.

More specifically, it is an object of the present invention to provide a reproducing apparatus in which a boosted pilot signal can be reliably detected even when the level of a reproduced signal of a signal fluctuates.

It is another object of the present invention to provide a reproducing apparatus whose compatibility can be improved.

It is a further object of the present invention to provide a reproducing apparatus which is suitably applied to an 8-mm video tape recorder.

As an aspect of the present invention, an apparatus for reproducing an information signal modulating a carrier signal recorded on a magnetic tape, a portion of the signal being boosted in accordance with the characteristic of the information signal, comprises a playback device for reproducing the information signal from the magnetic tape, a detector for detecting the levels of the portion of the signal and the rest of the signal respectively and comparing the levels with each other, and a judging circuit for judging the characteristics of the signal in accordance with the output of the detector means.

The above, and other objects, features and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 1 is a diagram of frequency spectrum used to explain a tape format of an 8-mm video tape recorder;

FIGS. 3A through 3J and FIGS. 4A through 4J are timing charts, respectively, used to explain operation of the present invention.

DETAILED DESCRIPTION OF THE PREFERRED EMBODIMENT

Figure 2A:
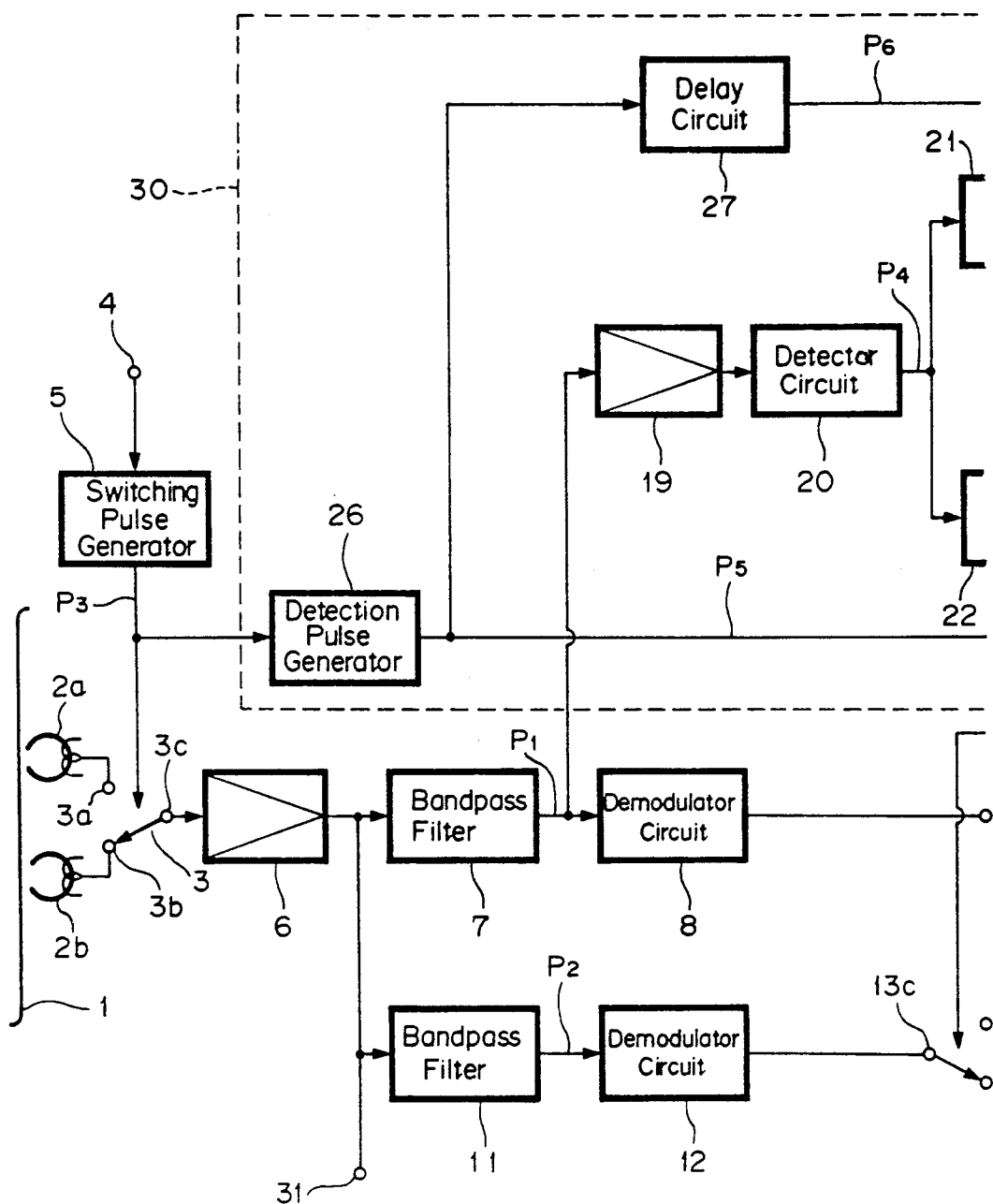
FIG. 2 (formed of FIGS. 2A and 2B) is a block diagram showing an embodiment of a reproducing apparatus according to the present invention.
Figure 2B:
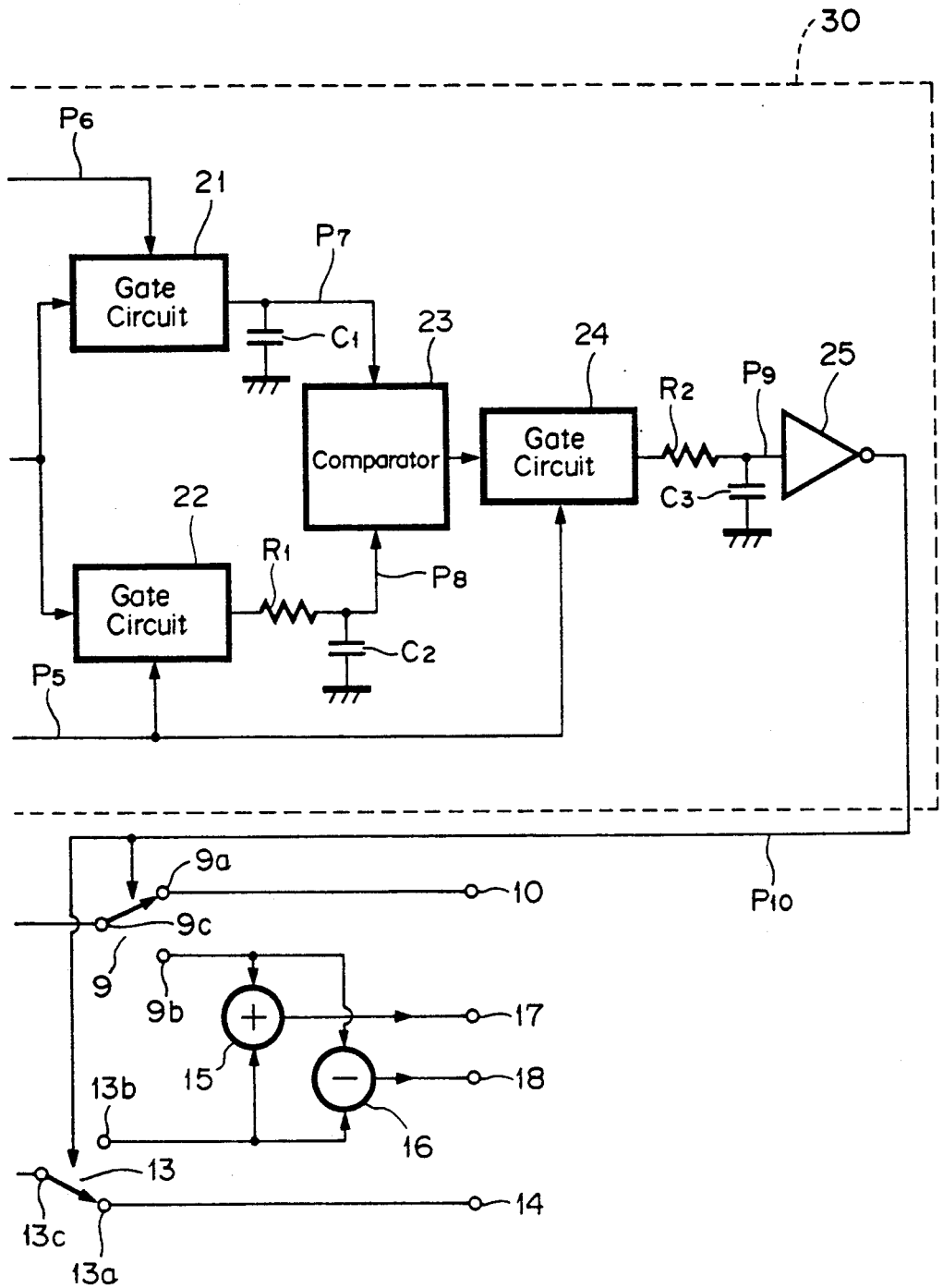

An embodiment of the reproducing apparatus according to the present invention will hereinafter be described with reference to FIG. 2. FIG. 2 shows in block form the circuit arrangement of the reproducing apparatus of this invention and is formed of FIGS. 2A and 2B drawn on two sheets of drawings so as to permit the use of a suitably large scale.

In FIG. 2, reference numeral 1 designates a magnetic tape on which a pilot signal for identifying the stereo signal boosted by, for example, 7 dB or the bilingual signal is recorded together with a video signal or the like. Recording signals recorded on the magnetic tape 1 are reproduced by magnetic heads 2a and 2b. Reference numeral 3 designates a switch, and the magnetic head 2a is connected to one fixed contact 3a of the switch 3, while the magnetic head 2b is connected to the other fixed contact 3b of the switch 3. A movable contact 3 of the switch 3 is connected to an input terminal of a playback amplifier 6. A switching pulse generator circuit 5 generates a switching pulse $P_3$ (see FIGS. 3C and 4C), which switches the switch 3, in response to a reference signal or the like supplied thereto from a video signal processing system (not shown) through an input terminal 4. The AFM signals (RF signals) from the magnetic heads 2a and 2b are alternately supplied to the playback amplifier 6 in response to the switching pulse $P_3$.

The AFM signal from the playback amplifier 6 is supplied to the video signal processing system through a terminal 31 and band pass filters 7 and 11. The AFM signal $P_1$ (see FIGS. 3A and 4A) supplied to the bandpass filter 7 is the signal whose carrier, for example, is 1.5 MHz and this AFM signal $P_1$ is supplied through the bandpass filter 7 to a demodulator circuit 8. On the other hand, the AFM signal $P_2$ (see FIGS. 3B and 4B) supplied to the bandpass filter 11 is the signal whose carrier, for example, is 1.7 MHz and this AFM signal $P_2$ is supplied through the bandpass filter 11 to a demodulator circuit 12.

Reference numeral 9 designates a switch, and a movable contact 9c of the switch 9 is connected to the output terminal of the demodulator circuit 8. One fixed contact 9a of the switch 9 is connected to a bilingual signal output terminal 10, and the other fixed contact 9b of the switch 9 is connected to input terminals of an adder 15 and a subtracter 16. Further, an output terminal of the adder 15 is connected to a left audio signal output terminal 17 and an output terminal of the subtracter 16 is connected to a right audio signal output terminal 18.

Reference numeral 13 designates a switch, and a movable contact 13c of the switch 13 is connected to the output terminal of the demodulator circuit 12. One fixed contact 13a of the switch 13 is connected to the other bilingual signal output terminal 14, and the other fixed contact 13b of the switch 13 is connected to the other input terminals of the adder 15 and the subtracter 16.

The above switches 9 and 13 are changed in position in response to a control signal $P_{10}$ (see FIGS. 3J and 4J) from a detecting circuit 30 which will be described later when the reproduced signals from the demodulator circuits 8 and 12 are the bilingual signals or the stereo audio signals. Accordingly, when the reproduced signals from the demodulator circuits 8 and 12 are the bilingual signals, the movable contacts 9c and 13c of the switches 9 and 13 are connected, respectively, to the fixed contacts 9a and 13a, whereby the bilingual signals are fed to the outside through the bilingual signal output terminals 10 and 14, respectively.

When the reproduced signals from the demodulator circuits 8 and 12 are the stereo audio signals, that is, sum and difference signals of the left and right audio signals, the movable contacts 9c and 13c of the switches 9 and 13 are connected, respectively, to the fixed contacts 9b and 13b. Thus, the result of adding the sum signal and difference signal of the left and right audio signals, that is, the left audio signal, is supplied to the left audio signal output terminal 17, and the result of subtracting the sum signal and difference signal of the left and right audio signals, that is, the right audio signal, is supplied to the right audio signal output terminal 18.

The detecting circuit 30 for generating the control signal $P_{10}$ which controls the switches 9 and 13 as described above will be described below.

In the detecting circuit 30, a detection pulse generating circuit 26 generates a detection pulse $P_5$ (see FIGS. 3E and 4E) in response to the switching pulse $P_3$ from the switching pulse generator circuit 5. The detection pulse $P_5$ is supplied to gate circuits 22 and 24 and is also supplied through a delay circuit 27 to a gate circuit 21.

The AFM signal (RF signal) $P_1$ (see FIGS. 3A and 4A) from the bandpass filter 7 is supplied through an amplifier 19 to an envelope detector circuit 20. The detector circuit 20 envelope-detects the AFM signal $P_1$ to generate a detected signal $P_4$ (see FIGS. 3D and 4D), and the detected signal $P_4$ is supplied to the gate circuits 21 and 22. The delay circuit 27 delays the detected signal $P_5$ (see FIGS. 3E and 4E) to generate a detected pulse $P_6$ (see FIGS. 3F and 4F), and the gate circuit 21 permits the detected signal $P_4$ from the detecting circuit 20 to pass therethrough on the basis of the detected pulse $P_6$ from the delay circuit 27. An output signal from the gate circuit 21 is held by a capacitor $C_1$ and supplied to a comparator 23 as a gate output signal $P_7$ (see FIGS. 3G and 4G). Further, the gate circuit 22 permits the detected signal $P_4$ from the detector circuit 20 to pass therethrough in response to the detected pulse $P_5$ from the detection pulse generator circuit 26. A gate output signal $P_8$ (see FIGS. 3H and 4H) from the gate circuit 22 is supplied to the comparator 23. The comparator 23 compares the gate output signal $P_7$ from the gate circuit 21 and the gate output signal $P_8$ from the gate circuit 22 and supplies a compared result signal to the gate circuit 24.

The gate circuit 24 permits the compared result signal from the comparator 23 to pass therethrough on the basis of the detected pulse $P_5$ from the detection pulse generator circuit 26. The gate output signal from the gate circuit 24 is held by a capacitor $C_3$, inverted by an inverter 25 and fed to the above switches 9 and 13 as a detected result signal $P_{10}$ (see FIGS. 3J and 4J), that is, a control signal.

Operation of the above detecting circuit 30 will be described with reference to the timing charts forming FIGS. 3A through 3J and FIGS. 4A through 4J.

FIGS. 3A through 3J show the case in which the vertical blanking period of the AFM signal is boosted, that is, the bilingual signal. The AFM signal $P_1$ (FIG. 3A) from the bandpass filter 7 is envelope-detected by the envelope detector circuit 20, and the detected signal $P_4$ (FIG. 3D) from the detector circuit 20 is selected to be low in level, for example, 1 Volt. Upon recording, the high level portion as the pilot signal is boosted by, for example, about 7 dB as compared with the low level portion. The detected signal $P_4$ is gated by the gate circuits 21 and 22 during the periods in which the detected pulses $P_5$ and $P_6$ (FIGS. 3E and 3F) are at low "0" level, thereby being produced as the gate output signals $P_7$ and $P_8$ (FIGS. 3G and 3H), respectively. Then, the two gate output signals $P_7$ and $P_8$ are compared with each other by the comparator 23 and fed through the gate circuit 24 to the inverter 25 as a gate output signal $P_9$. The gate output signal $P_9$ is inverted by the inverter 25 and supplied to the switches 9 and 13 as the detected result signal $P_{10}$. Then, the movable contacts 9c and 13c of these switches 9 and 13 are connected to the fixed contacts 9a and 13a by the detected result signal $P_{10}$. In consequence, the bilingual signals from the demodulator circuits 8 and 12 are supplied, respectively, to the bilingual signal output terminals 10 and 14.

FIGS. 4A through 4J show the case in which the vertical blanking period of the AFM signal is not boosted, that is, the stereo audio signal.

The AFM signal $P_1$ (FIG. 4A) from the bandpass filter 7 is envelope-detected by the envelope detector circuit 20. The detected signal $P_4$ (FIG. 4D) from the envelope detector circuit 20 is not boosted as the pilot signal upon recording and is therefore at low level (e.g., 1 Volt). The detected signal $P_4$ is gated by the gate circuits 21 and 22 during the periods in which the detected pulses $P_5$ and $P_6$ are at low "0" level (FIGS. 4E and 4F), thereby being generated as the gate output signals $P_7$ and $P_8$ (FIGS. 4G and 4H), respectively. The two gate output signals $P_7$ and $P_8$ are compared with each other by the comparator 23 and supplied through the gate circuit 24 to the inverter 25 as the gate output signal $P_9$. The gate output signal $P_9$ is inverted by the inverter 25 and supplied to the switches 9 and 13 as the detected result signal $P_{10}$. Therefore, the movable contacts 9c and 13c of these switches 9 and 13 are connected to the fixed contacts 9b and 13b by the detected result signal $P_{10}$. In consequence, the sum signal and the difference signal of the left and right audio signals from the demodulator circuits 8 and 12 are supplied, respectively, to the adder 15 and the subtracter 16. The sum signal and the difference signal of the left and right audio signals are added and subtracted, respectively, and the resultant left and right audio signals are supplied to the left audio signal output terminal 17 and the right audio signal output terminal 18, respectively.

As will be clear from the above description, since the detected signal $P_4$ from the envelope detector circuit 20 is gated by the detected pulse $P_5$ whose gate period exists in the vertical blanking period of the boosted portion of the detected pulse $P_4$, while the detected signal $P_4$ is gated by the detected pulse $P_6$ whose gate period exists in other period than the vertical blanking period of the boosted portion of the detected signal $P_4$, the levels of the detected signal $P_4$ in the vertical blanking period and in the period other than the vertical blanking period can be compared. Therefore, even when the level of the AFM signal fluctuates, either the bilingual signal or the stereo audio signal can be detected reliably. Further, since it can be determined reliably whether the AFM signal is the bilingual signal or the AFM signal regardless of the level fluctuation of the AFM signal, the AFM signal can be reliably identified as the bilingual signal or the stereo audio signal even in the variable speed playback mode in which the level of the AFM signal fluctuates. Since there is a tolerance in the margin to detect whether the AFM signal is the bilingual signal or the stereo audio signal, such detection can be made similarly even when a magnetic tape on which signals are recorded by other apparatus is reproduced, which can improve compatibility with other apparatus.

While the AFM signal is the stereo audio signal as described above and a circuit for processing the monaural audio signal is not shown and the explanation thereof is not made, it can be easily understood that a monaural audio signal can be similarly processed.

According to the present invention, the boost period of the signal in which the signal is boosted and inserted as the pilot signal and the period in which the signal is not boosted are compared, the presence or absence of the pilot signal is detected and the reproduced signal which reproduces the signal is processed on the detected signal. Thus, even when the level of the reproduced signal which reproduces the signal fluctuates, the signal boosted as the pilot signal is satisfactorily detected, thereby the compatibility with other apparatus being improved.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. An apparatus for reproducing an information signal modulating a carrier signal recorded on a magnetic tape, a first portion of said signal being boosted in level in accordance with a characteristic of said information signal, said apparatus comprising:
   playback means for reproducing said information signal from said magnetic tape;
   level detector means receiving said information signal for detecting a level of said reproduced signal and producing a level detected signal;
   first and second gating means for respectively gating said level detected signal during a first time period corresponding to said first portion of said signal being boosted and during a second time period corresponding to a second portion of said signal in which a level of said signal is not boosted and producing first and second gated signals, respectively;
   comparing means for making a comparison of levels of said first and second gated signals with each other, and producing an output signal based on said comparison; and
   judging means for judging said characteristic of said information signal in accordance with the output signal of said comparing means and producing a control output signal in accordance with said characteristic of said information signal.

2. An apparatus according to claim 1 wherein said information signal comprises an audio signal.

3. An apparatus according to claim 2 wherein said characteristic of said audio signal is that said audio signal is a bilingual signal.

4. An apparatus according to claim 3 wherein said first portion is a vertical blanking period.

5. An apparatus according to claim 1 further comprising processor means for processing said reproduced signal.

6. An apparatus according to claim 5 wherein said processor means comprises switching means controlled by the control output signal of said judging means and an adder and a subtracter selectively connectable to said switching means in accordance with said control output signal.

7. An apparatus according to claim 2 wherein said carrier signal is frequency-modulated by said audio signal.

8. An apparatus according to claim 7 wherein said audio signal comprises a first audio signal and a second audio signal.

9. An apparatus according to claim 8 wherein said first and second audio signals are recorded with a luminance signal and chrominance signal.

10. An apparatus according to claim 9 wherein said first and second audio signals are further recorded with a tracking signal.

* * * * *